H. LEGGETT.
POWER TRANSMISSION SHAFT.
APPLICATION FILED DEC. 17, 1917.
1,315,782.
Patented Sept. 9, 1919.
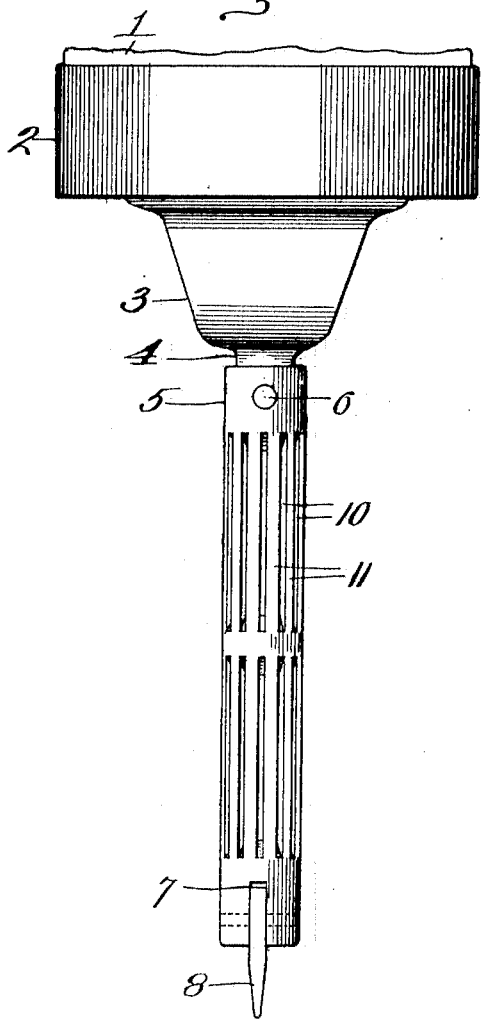
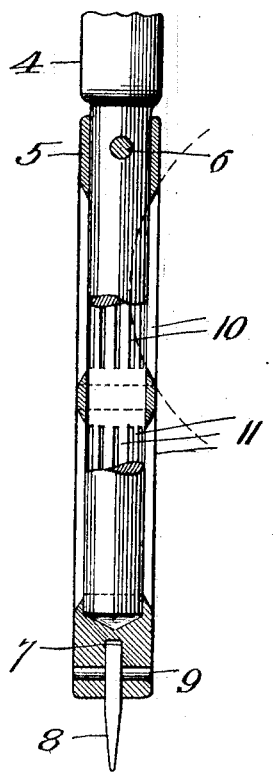
INVENTOR:
Herbert Leggett.
BY
George␣Thorpe
ATTORNEY

UNITED STATES PATENT OFFICE.

HERBERT LEGGETT, OF KANSAS CITY, MISSOURI, ASSIGNOR TO ECLIPSE VALVE GRINDER COMPANY, OF KANSAS CITY, MISSOURI, A CORPORATION OF DELAWARE.

POWER-TRANSMISSION SHAFT.

1,315,782.      Specification of Letters Patent.      Patented Sept. 9, 1919.

Application filed December 17, 1917. Serial No. 207,805.

*To all whom it may concern:*

Be it known that I, HERBERT LEGGETT, a citizen of the United States, residing at Kansas City, in the county of Jackson and State of Missouri, have invented new and useful Improvements in Power-Transmission Shafts, of which the following is a specification.

This invention relates to power transmission shafts, and more especially to shafts which oscillate and transmit power alternately in opposite directions. The object of the invention is to produce an oscillatory shaft designed particularly for use on a valve grinder, which will yield slightly to the shocks of action and reaction and thereby relieve the driving and driven mechanism of such shocks and minimize danger of injury thereto and of crystallization of the shaft.

With this object in view the invention consists in a certain novel and useful features of construction and combinations of parts as hereinafter described and claimed, and in order that the invention may be fully understood reference is to be had to the accompanying drawing, in which:—

Figure 1, is a side elevation of part of a valve-grinder equipped with a shaft embodying my invention.

Fig. 2, is a central vertical section of said shaft.

Fig. 3, is a cross section of the outer member or sleeve of the shaft.

Referring now to the drawing in detail, 1 indicates part of a valve grinder of any suitable or preferred type, 2 is a cap closing the bottom of the body portion and provided with a centrally-depending hub 3, through which extends the drive shaft for transmitting power from driven mechanism within the body 1, to the valve (not shown) to be ground.

The shaft forming the novel feature of the invention, consists of an inner member 4, journaled in the said hub of the cap 2 and geared as explained to mechanism within the body, and an outer or sleeve member 5, the latter fitting telescopically on the former exterior to the hub 3, and secured firmly at its upper end to said member 4, by a cross-pin 6, it being noted in this connection that the sleeve bears a journaled relation near its opposite or free end to the inner member and is therefore maintained in axial alinement therewith at all times and regardless of the rapidity of operation. The lower end of the sleeve constitutes a socket for the lower end of the inner member and in action presses up against the latter and relieves the cross-pin of some strain to which it would otherwise be subjected.

The lower extremity of the sleeve member is bifurcated at 7, to receive the shank of a "bit" 8, of the screw-driver or spanner type, to be used in oscillating a valve or the like, not shown, a cross-pin 9, extending through the sleeve and "bit" to hold the latter in position.

The sleeve 5 is provided with a plurality of longitudinally-extending slots 10 and alternating strips 11, and is made from spring metal so that said strips shall be susceptible of yielding laterally when the sleeve is subjected to a sufficiently powerful twisting force, such as is applied when the "bit" is engaged with a valve and the shaft is placed in gear with a motor or the like, not shown, but which in practice, is housed within the body 1, and utilized as the driving power of the machine. The slotting of the sleeve may be effected in any proper manner, the work heretofore having been done by means of a rotary saw or cutter, as indicated by dotted lines in Fig. 2.

When the "bit" is fitted to the valve to be ground and the power turned on the sleeve will twist slightly, the upper end turning with the inner member and the lower end remaining immovable with the valve until the resistance of the latter is overcome by the gradual increase of force imposed upon it by the sleeve. As the rotation is reversed a similar action occurs and is repeated upon each subsequent change in the direction of rotation. It will thus be seen that the twisting of the sleeve member of the shaft affords a cushioning action for the action and reaction of the shaft and that consequently, the shocks incident to sudden starting and stopping of the motor are absorbed by the shaft and not suddenly imposed on the mechanism which drives the shaft, it being also apparent that the resiliency of the shaft guards against any chance of its crystallization.

From the above description it will be apparent that I have produced a power transmission shaft embodying the features of construction enumerated as desirable in the statement of the object of the invention, and while the preferred construction has been illustrated and described in detail, it will be apparent that it is susceptible of modification without departing from the spirit and scope of the appended claim.

I claim:

A shaft composed of an inner member, a sleeve member of spring material, fitting on said inner member and projecting beyond one end thereof and provided with a plurality of longitudinal slots terminating short of its ends, and means securing the extremity of the sleeve which fits upon the inner member, rigidly to the latter.

HERBERT LEGGETT.

Copies of this patent may be obtained for five cents each, by addressing the "Commissioner of Patents, Washington, D. C."